Oct. 22, 1968 W. E. ENGELHARD 3,407,097

THERMOCOUPLE

Filed June 7, 1966

INVENTOR
W. E. ENGELHARD

BY ATTORNEY

United States Patent Office 3,407,097
Patented Oct. 22, 1968

3,407,097
THERMOCOUPLE
William E. Engelhard, Apalachin, N.Y., assignor to Pyro-Serv Instruments, Inc., North Arlington, N.J., a corporation of New Jersey
Filed June 7, 1966, Ser. No. 555,864
2 Claims. (Cl. 136—221)

ABSTRACT OF THE DISCLOSURE

A temperature measuring device for electrically conductive surfaces, having two thermocouple leads which yieldably conform to insure contact with the surface and which together with the surface form a temperature sensing junction. One lead is offset from its axis and the other lead encircles the offset lead.

Figure 1:
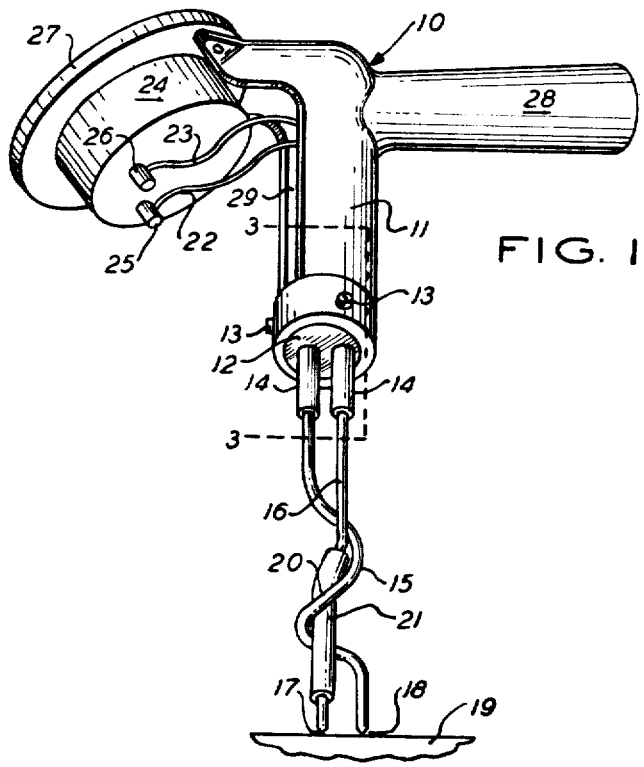

This invention relates to a portable sensing thermal instrument, for measuring surface temperature, for example, on articles emerging from a furnace or other heating area. The device has pressure contact leg members automatically self-compensating for irregularities of the surface to be measured so that on pressuring the leg members against an uneven surface they will adjust to irregular contours and maintain contact thereof.

The thermocouple of the invention comprises a medial body portion, a pair of contact leg members extending preferably through support bearings in the housing.

Pursuant to the invention, a handle member is provided, secured to the medial body portion at right angles thereto for facility of handling, and a thermocouple instrument is incorporated in the side of the body portion opposite the handle and angularly directly downwardly for facility of reading, so that, on positioning the contact leg members against the surface to be thermally measured, the operator may readily read the indicated temperature. The thermocouple junction may be disposed in the instrument portion of the thermocouple body member remote from the source of heat, thermally protecting the same.

The contact leg members of the thermocouple may be formed of nickel chrome thermocouple alloys similar to those used for resistance heating elements, or of other suitable heat resisting thermocouple materials.

The drawings, illustrating procedures and devices useful in carrying out the invention, and the description below, are exemplary only of the invention, which shall be deemed to cover all other devices and procedures coming within the scope and purview of the appended claims.

Figure 2:
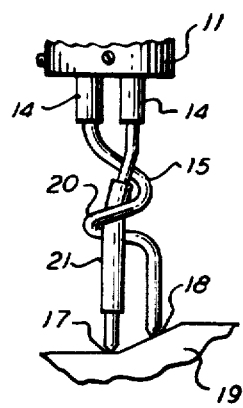
Figure 3:
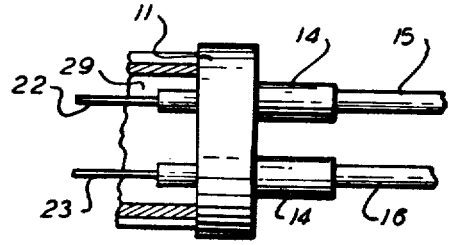

In the drawings, wherein similar reference characters indicate like parts:

FIG. 1 is a side elevational view of a device embodying the invention, shown applied to an even surface to be measured, FIG. 2 is a fragmentary elevational view of the lower portion of the medial body member and contact leg members, applied to an uneven surface to be measured, and FIG. 3 is an enlarged, partly fragmentary, elevational view taken at line 3—3 of FIG. 1.

As shown in FIG. 1, the thermocouple 10 comprises a medial body portion 11, having a block 12 which may be removably secured to the body portion 11 by means such as screws 13 or the like, and having bearings 14 fixed to block 12 and extending therefrom, contact leg members 15 and 16 of Nichrome (Driver-Harris trademarked "Nickel-chrome") or other heat resisting thermocouple material, secured to the bearings and preferably terminating in pointed free ends 17, 18 for pressure contact with the surface of article 19 to be thermally measured.

One of the contact leg members 15, is provided with one or more convolutions 20 and is made of that alloy of the thermocouple having the best mechanical properties of the two. Thus, as will be noted from FIG. 2, the leg member 15 having a convolution 20 automatically adjust itself to uneven contours of the surface to be measured. That portion of the other contact leg member 16 which passes through the convolution portion 20 of the first contact leg member 15 is preferably covered or coated with a dielectric coating 21 to insulate the same therefrom and may be offset axially toward the first contact leg member (15) as shown in the drawing (FIG. 2) to enable convolution 20 to freely move along in spaced relation. The contact leg members 15, 16 as above noted are mounted in the body member 11 and extend therefrom; through block 12 and bearings 14 (FIG. 1) they are connected internally of the body member as by wires 22, 23, or the like, with a thermocouple junction which may be remote from the contact leg members and thus from the source of heat 19 and unaffected thereby; a thermocouple to extension lead-wire junction may be mounted in the instrument housing 24 and connected to the wires 22, 23 through posts 25, 26 (FIG. 1), for facility of reading of the thermal condition measured at the face 27 of the instrument housing 24. The instrument handle 28 is disposed at essentially right angles to the plane of the medial body portion 11 to facilitate handling; the body portion 11 is preferably formed open at one face (29, FIG. 3) to facilitate assembly of the wires 22, 23 onto the ends of the bearings 14 extending into the medial portion 11 through block 12; the latter, as above noted, being removably positioned in the body member through set screws 13 or the like (FIG. 1).

While the foregoing disclosure of exemplary embodiments, is made in accordance with the patent statutes, it is to be understood that the invention is not limited thereto or thereby, the inventive scope being defined in the appended claims.

I claim:
1. In a thermocouple device for measuring the temperature of uneven surfaces comprising:
   (a) a body portion,
   (b) a handle portion, connected to said body portion,
   (c) support bearings fixed to and extending from said body portion,
   (d) a pair of leg members fixed to said support bearings in spaced relation to said body portion,
   (e) a first leg having a linear elongated axial portion and a free end portion connected with the elongated axial portion and offset therefrom, said offset portion being yieldable,
   (f) the second leg member being medially convoluted in form and extending from one side of said body portion and encircling the offset portion of the first leg member, and terminating in a free end portion substantially parallel to the free end portion of the first leg member and laterally spaced therefrom, so that the convolution of the second leg member may be yieldable along the axially offset portion of the first leg member.

2. In a thermocouple, as set forth in claim 1, a dielectric coating on the axially offset portion of said first leg member.

(References on following page)

References Cited

UNITED STATES PATENTS 2,223,408  12/1940  Dietert _____ 73—359 XR

OTHER REFERENCES

Griffiths, E.: Temperature Measuring Appliances, in the Journal of Scientific Instruments, vol. 5, No. 2, pp. 63–4 (page 64 relied on).

Publication: Elmatic No. 403 Pyrometer, received in U.S. Patent Office on or before Dec. 31, 1960.

S. CLEMENT SWISHER, *Acting Primary Examiner.*

F. SHOON, *Assistant Examiner.*